US010136585B1

(12) United States Patent
Ahlers et al.

(10) Patent No.: US 10,136,585 B1
(45) Date of Patent: Nov. 27, 2018

(54) IN-GROUND SEED STARTING APPARATUS AND METHOD

(71) Applicants: Courtney Ahlers, Millstone, NJ (US); Doreen Catena, Rumson, NJ (US)

(72) Inventors: Courtney Ahlers, Millstone, NJ (US); Doreen Catena, Rumson, NJ (US)

(*) Notice: Subject to any disclaimer, the term of this patent is extended or adjusted under 35 U.S.C. 154(b) by 0 days.

(21) Appl. No.: 15/591,427

(22) Filed: May 10, 2017

Related U.S. Application Data

(60) Provisional application No. 62/381,742, filed on Aug. 31, 2016.

(51) Int. Cl.
*A01G 9/02* (2018.01)
*A01G 9/029* (2018.01)
*A01G 13/10* (2006.01)

(52) U.S. Cl.
CPC .............. *A01G 9/029* (2018.02); *A01G 9/021* (2013.01); *A01G 9/0291* (2018.02); *A01G 13/10* (2013.01)

(58) Field of Classification Search
CPC . A01G 9/02; A01G 9/021; A01G 9/10; A01G 9/102; A01G 9/1026; A01G 9/108
USPC ........... 47/1.01 P, 60, 61, 63, 65, 65.5, 65.7, 47/66.1, 66.3, 66.4, 73, 74, 77
See application file for complete search history.

(56) References Cited

U.S. PATENT DOCUMENTS

| | | | |
|---|---|---|---|
| 610,156 A | 8/1898 | Mechwart et al. | |
| 2,140,932 A * | 12/1938 | Avery | A01G 9/026 162/143 |
| 3,098,321 A | 7/1963 | Estkowski et al. | |
| 4,223,480 A * | 9/1980 | Welty | A01G 9/026 47/65.6 |
| 4,317,311 A | 3/1982 | Schmitt | |
| 4,336,669 A | 6/1982 | Gordon | |
| 4,550,527 A * | 11/1985 | Hall | A01G 1/048 424/93.5 |
| 4,939,865 A * | 7/1990 | Whitcomb | A01G 23/04 47/73 |
| 6,195,938 B1 * | 3/2001 | Kay | A01G 9/1006 47/65.8 |
| 6,405,481 B1 * | 6/2002 | Bautner | A01G 9/104 47/65.8 |
| 6,481,593 B2 * | 11/2002 | Banhagel | A01G 9/10 220/676 |
| 6,792,714 B1 * | 9/2004 | Lyons | A01C 1/042 111/199 |
| 6,904,715 B1 | 6/2005 | Lawton | |
| 7,438,224 B1 * | 10/2008 | Jensen | B42D 15/0053 235/379 |

(Continued)

FOREIGN PATENT DOCUMENTS

| | | |
|---|---|---|
| DE | 9413987 | 1/1996 |
| EP | 0570060 | 11/1993 |
| WO | 2011140650 | 11/2011 |

*Primary Examiner* — Lisa L Tsang
(74) *Attorney, Agent, or Firm* — Gearhart Law LLC (57) ABSTRACT

A device for promoting plant seedling growth and increasing the germination rate of planted seeds provides for a growing medium, such as potting soil, to be introduced to the device and retained therein. The seeds can then be positioned within the device which is configured to prevent loss of the seeds (due to washout) and promote the germination rate of the seeds. Once the seedlings have achieved a requisite height and root structure, the device can be removed leaving behind a portion of the device forming a labeling tab.

8 Claims, 12 Drawing Sheets

(56) References Cited

U.S. PATENT DOCUMENTS

| | | | |
|---|---|---|---|
| 8,474,181 B2 * | 7/2013 | Whitehead | A01G 9/02 47/65.7 |
| 2002/0005011 A1 | 1/2002 | Goldberg et al. | |
| 2003/0034266 A1 | 2/2003 | Banhagel | |
| 2010/0115836 A1 * | 5/2010 | Julian | A01G 9/021 47/65.7 |
| 2014/0208645 A1 * | 7/2014 | Guggenheim | A01G 1/001 47/65.7 |
| 2016/0073590 A1 * | 3/2016 | Brust | A01G 9/02 47/66.7 |
| 2016/0120134 A1 | 5/2016 | Cano Torres | |

* cited by examiner

IN-GROUND SEED STARTING APPARATUS AND METHOD

CLAIM OF PRIORITY

This application claims priority to U.S. Application No. 62/381,742 filed on Aug. 31, 2016, the contents of which are herein fully incorporated by reference in its entirety.

FIELD OF THE EMBODIMENTS

The field of the embodiments of the present invention relate to apparatus for promoting plant seedling growth and increasing the germination rate of planted seeds.

BACKGROUND OF THE EMBODIMENTS

Various pots, containers, cans, and the like are traditionally used for the containment of soil or other growing medium(s) useful in growing plants. Typically, such devices form a containment vessel capable of protecting the plant root structure located within the growing medium from damage during the initial root growing/establishment stages. In addition, these devices aid in the continued development of a plant prior to permanent implantation.

It is often the case that a person desires to plant multiple plant varieties in an outdoor garden or landscape space. However, due to unforeseeable inclement environmental conditions or because of the activity of other family members, pets, pests, etc., such a garden or landscape is at risk of being damaged if it is not protected.

Consequently, it is an object of the present invention to provide a bottomless compartmentalized seed starting vessel which may be inserted directly in the ground and filled with a growing medium. This, in turn, provides designated regions within a single growing medium or existing location where each device or vessel may have select varieties of plants in which the growing medium may be individually tailored to the specific needs of the plants. Further, the plants may be offered protection from people and the elements by the device.

Commonly, "plant pots" or "plant containers" are manufactured from a variety of materials including but not limited to various clays, cements, metals, ceramics, plastics, and the like. Disposable plastic plant pots are frequently used in the nursery industry due to their relative low cost and structural rigidity. However, at least one shortcoming associated with these disposable plastic plant pots relates to removing the plant from the plant pot for replanting or implantation and the enclosed nature of the pots. Over time, the plant root system may become intertwined with the inner surface of the pot, making the removal of the plant root system from the disposable plastic plant pot difficult if not impossible. Often, the plant removal process results in substantial and irreversible damage to the plant root system. Further, such containers have a structure which does not support proper drainage thereby harming the plant.

Thus, there is a need for a temporary bottomless plant pot or seed starting apparatus that can protect the seeds/seedlings and be readily removable from the plant and root system when the time comes. The present invention and its embodiments meets and exceeds these objectives. Review of related technology:

U.S. Pat. No. 6,904,715 pertains to a panel for use as a side wall of a plant growth container. In one embodiment, the panel comprises an elongate cuspated sheet having apertures formed in at least some of the outwardly projecting cusps to facilitate air root pruning of the root structure of a plant grown within the container. The sheet includes a non-cuspated edge section, the non-cuspated edge section being co-operable with a complementary edge section of the same sheet or of an adjacent sheet. The co-operable edge sections form a guideway for holding means, the holding means passing along the guideway releasably hold the edge sections in use form a side wall of the container. A plant growth container having at least one panel as described is also disclosed.

U.S. Pat. No. 4,336,669 pertains to a container for planting seeds or seedlings either manually, mechanically, or by air drop. The container includes at least one tubular cone formed by fluid hardened by freezing and having a tapered lower end, an open upper end, and an inner cavity for receiving soil and a seed or seedling.

U.S. Patent Application 2003/0034266 pertains to a removable plant container for growing and transporting plants having a base member in communication with a lateral support wall. The base member (bottom of container) and lateral support wall define a receiving aperture, having a volume V, for receiving the plant and growing media therein. At least one removal device is in communication with the lateral support wall, the base member, or both. Actuation of the at least one removal device results in an increase in the volume of the receiving aperture from volume V to volume V', thereby permitting the removal of the plant and growing media without damage to the plant root system of root ball.

U.S. Patent Application 2002/0005011 pertains to a bottomless compartmentalized in-ground garden container for transplanting plants that includes a rigid outer wall defining a perimeter and having opposite upper and lower edges around the perimeter. Rigid compartment walls extend at least partially across the perimeter. The compartment walls intersect the outer wall and other compartment walls so as to form compartments within the perimeter. The upper edge of the outer wall has a widened portion so as to have a thickness greater than a thickness of the lower edges of the outer wall and the compartment walls. The lower edges of the outer wall and the compartment walls are adapted to slice into soil. The widened portion is adapted for distributing pressure applied manually downwardly by a downward hand pressure onto the widened portion so as to drive the lower edges of the walls into the soil. The container is bottomless so as to leave the outer walls and the compartment walls exposed to soil forced upwardly into the compartments.

European Application 0570060 pertains to a starter plant is planted in soil in a bottomless container, which is placed on a support surface. The plant is allowed to grow in a controlled environment until a time in its growing season when its root system is sufficiently developed to hold the soil in the container when the container is removed from the surface. Then, the plant and the container are planted as a unit in soil in a field. The plant is allowed to grow to full size in the field, where it develops a densely rooted basal plate inside the container and feeder roots that extend below the bottom of the container into the soil. The plant is harvested from the field by undercutting the feeder roots and removing the container and the plant as a unit from the soil. The foliage may be trimmed to a volume no bigger than the container, and the trimmed plant may be stored or shipped.

Various devices and methodologies are known in the art. However, their structure and means of operation are substantially different from the present disclosure. The present invention and its embodiments provide for an open bottom seed starting apparatus which may be comprised of a plastic or polymer material. The seed starting apparatus allows for direct sowing of seeds and a visual guide for proper spacing of the seeds. Further, a portion of the apparatus is present in the form of a tab removable from the remainder of the vessel body. The other known devices fail to demonstrate the superior germination rates and plant establishment exhibited by the present invention. At least one embodiment of this invention is presented in the drawings below and will be described in more detail herein.

SUMMARY OF THE EMBODIMENTS

Generally, the present invention and its embodiments provide for a seed starting apparatus. The seed starting apparatus may have a retainment vessel and a removable tab. In use, the retainment vessel may be filled with some amount of a growing medium such as sand, clay, loam, potting soil, soil, etc. or a combination thereof. Preferably, the level of the growing medium is below the top edge of the retainment vessel.

Once the growing medium has been supplied, seeds can be added to the apparatus. The seeds may be positioned in accordance with the generally accepted care (depth, covered/uncovered, etc.) for the particular seed type. Once the seeds begin germination, the seedlings can be readily observed, selected, and matured. In the interim, the seed starting apparatus provides for proper water drainage/retention, protects seeds and seedling from being washed away and destroyed, and an enhanced root system. After the seedlings have reached an acceptable size and root maturity, the seed starting apparatus can be partially removed leaving behind the removable tab portion of the apparatus. The removable tab may be labeled with the particular plant type(s) it denotes.

In one embodiment of the present invention there is a seed starting apparatus comprising: a circular retainment vessel made of a polymer material, the circular retainment vessel having an open top end and an open bottom end; and at least one tab extending above the open top end of the circular retainment vessel.

In another embodiment of the present invention there is a seed starting apparatus having a circular retainment vessel with an open top end and an open bottom end, wherein a diameter of the open top is greater than a diameter of the open bottom; a slit disposed in proximity to a first end of the retainment vessel; a tab disposed on a second end of the retainment vessel, the tab being configured to engage and be retained by the slit, wherein the tab has a neck and a head, with the head having a width that is greater in length than a length of the slit; and at least removable one tab extending above the open top end of the circular retainment vessel, wherein the at least one removable tab has perforations located along a first lateral edge and a second lateral edge of the removable tab.

In another embodiment of the present invention there is a method of planting at least one seed comprising: providing a seed starting apparatus comprising, a circular retainment vessel comprising a polymer material, the circular retainment vessel having an open top end and an open bottom end; and at least one removable tab extending above the open top end of the circular retainment vessel; positioning the seed starting apparatus in a seed growing location; filling the seed starting apparatus with a growing medium; and positioning the at least one seed within (at a depth) the growing medium.

In general, the present invention succeeds in conferring the following, and others not mentioned, benefits and objectives.

It is an object of the present invention to provide an apparatus that enables a user to conserve water.

It is an object of the present invention to provide an apparatus that enables a user to visualize the seed/seedlings contained therein.

It is an object of the present invention to provide an apparatus that enables a user to achieve a desired amount of separation between seedlings.

It is an object of the present invention to provide an apparatus that prevents washing away of seeds/seedlings.

It is an object of the present invention to provide an apparatus that has a detachable tab useful for labeling of the plant grown therein.

It is an object of the present invention to provide an apparatus that provides seeds with an increased germination rate.

It is an object of the present invention to provide an apparatus that promotes water retention.

DESCRIPTION OF THE PREFERRED EMBODIMENTS

The preferred embodiments of the present invention will now be described with reference to the drawings. Identical elements in the various figures are identified with the same reference numerals.

Reference will now be made in detail to each embodiment of the present invention. Such embodiments are provided by way of explanation of the present invention, which is not intended to be limited thereto. In fact, those of ordinary skill in the art may appreciate upon reading the present specification and viewing the present drawings that various modifications and variations can be made thereto.

Figure 1:
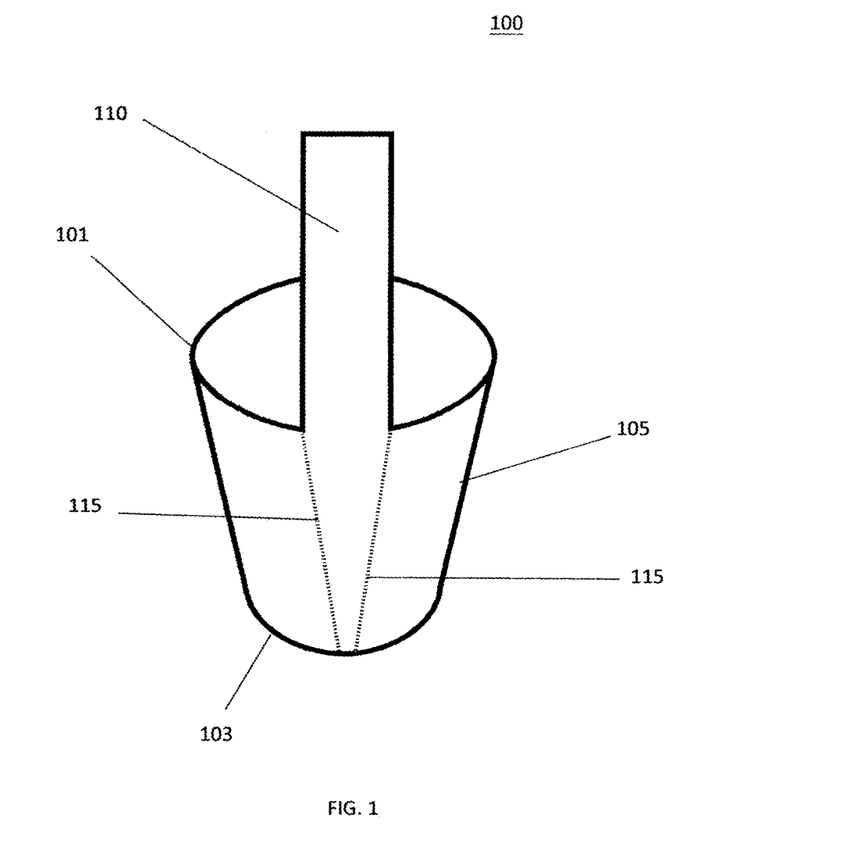
FIG. 1 is a back view of an embodiment of the present invention.
Figure 2:
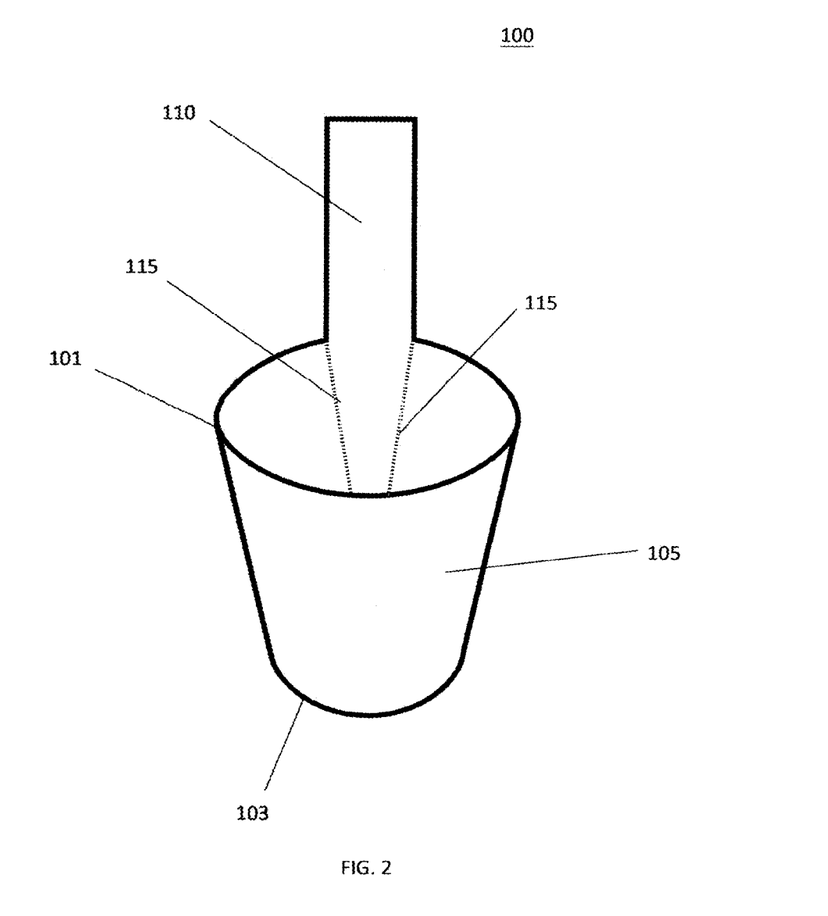
FIG. 2 is a front view of an embodiment of the present invention.
Figure 3:
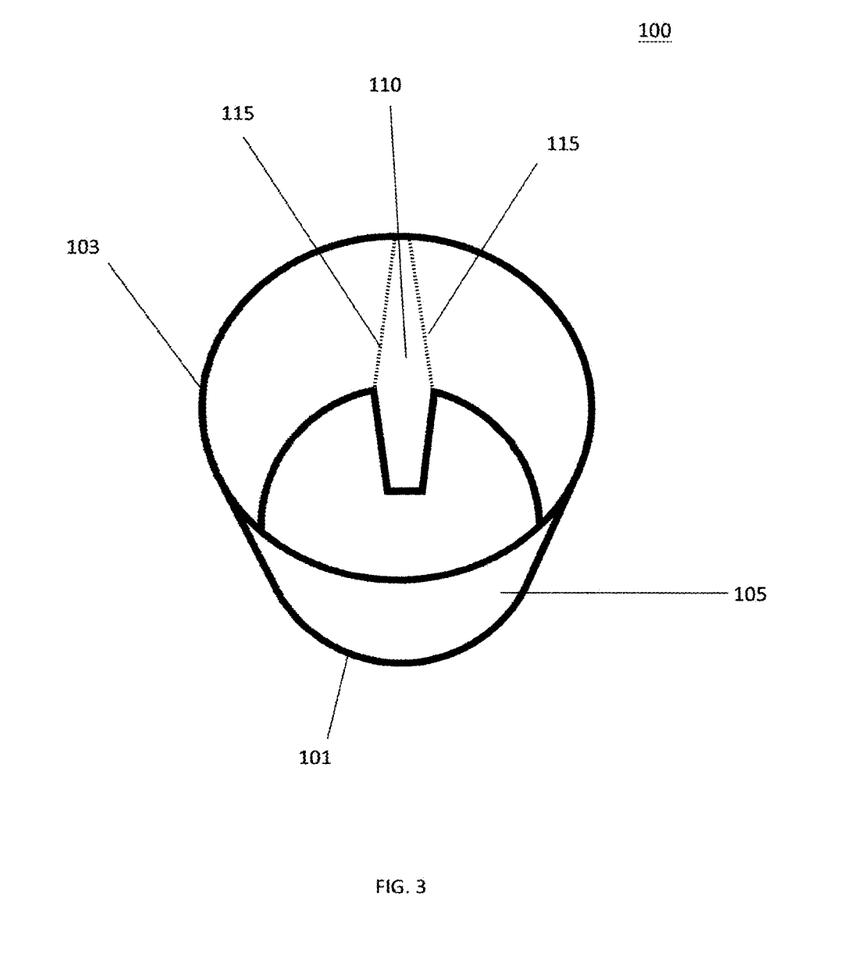
FIG. 3 is a bottom view of an embodiment of the present invention.

Referring now to FIGS. 1-3, there are varying views of an embodiment of the present invention. Here, the seed starting apparatus 100 is shown. The seed starting apparatus 100 generally comprises an open top 101, an open bottom 103, a retainment vessel 105, a tab 110, and perforations 115.

The retainment vessel 105 is generally a circular vessel having an open top 101 and an open bottom 103. The retainment vessel 105 is configured to retain some amount of a growing medium and seeds/seedlings (see FIGS. 4-8). It is preferable that the retainment vessel 105 is about 2 inches to about 12 inches in height and is more preferably about 5 inches in height.

The seed starting apparatus 100 has a taper from the top to the bottom causing a diameter of the open top 101 to be larger than that of the open bottom 103. The open top 101 may have a diameter of about 1 inch to about 10 inches and is more preferably about 3 inches to about 4 inches in diameter. The open bottom 103 may have a diameter of about 0.5 inch to about 8 inches and is more preferably about 2 inches to about 3 inches in diameter.

Along a rear of the retainment vessel 105 are perforations 115. The perforations 115 define a region of the retainment vessel 105 which may be selectively separated from the retainment vessel 105 thereby forming a tab 110. The perforations 115, while shown at the rear of the retainment vessel 105, may be disposed around a circumference of the retainment vessel 105. The perforations 115 may extend from the open top 101 to the open bottom 103 or may extend only some portion of this distance. Further, the number of perforations 115 may vary and preferably there are about one to about ten total perforations 115.

As shown, the tab 110 has a top and a bottom with the top rising above the open top 101 of the retainment vessel 105 and the bottom residing at the open bottom 103 of the retainment vessel 105.

The perforations 115 are positioned along the retainment vessel 105 and also have a taper from the open top 101 to the open bottom 103. The tab 110 decreases in width from the top to bottom of the retainment vessel 105. If the seed starting apparatus 100 no longer serves its purposes (plant is germinated and established), the seed starting apparatus 100 can be split into the retainment vessel 105 and the tab 110. The tab 110 can remain in proximity to the plant(s) which it formerly harbored. The tab 110 is constructed such that indicia may be positioned thereon to identify the type of plant, date of planting, visualization of watering, location, etc.

Preferably, the seed starting apparatus 100 is comprised of at least one plastic or polymer. In some embodiments, all components of the seed starting apparatus 100 are comprised of the same material whereas in other embodiments different components are comprised of different materials. In other embodiments, the seed starting apparatus 100 comprises at least one plastic or polymer and a biodegradable material. The biodegradable material may be a fungus or other biological material. The ratio between the polymer and the biodegradable material may vary.

Plastics used in construction of the seed starting apparatus 100 may include polyethylene terephthalate (PET), polyethylene (PE), high-density polyethylene, polyvinyl chloride (PVC), polyvinylidene chloride (PVDC), low-density polyethylene (LDPE), polypropylene (PP), polystyrene (PS), high impact polystyrene (HIPS) and polycarbonate (PC), or any combination thereof. Such plastic or combination of plastics may be selected for particular properties including molecular weight, rigidity, and cost. Further materials contemplated for inclusion by the present invention include papers, coated papers, corrugated papers, fiber reinforced materials, and the like or some combination thereof.

Figure 4:
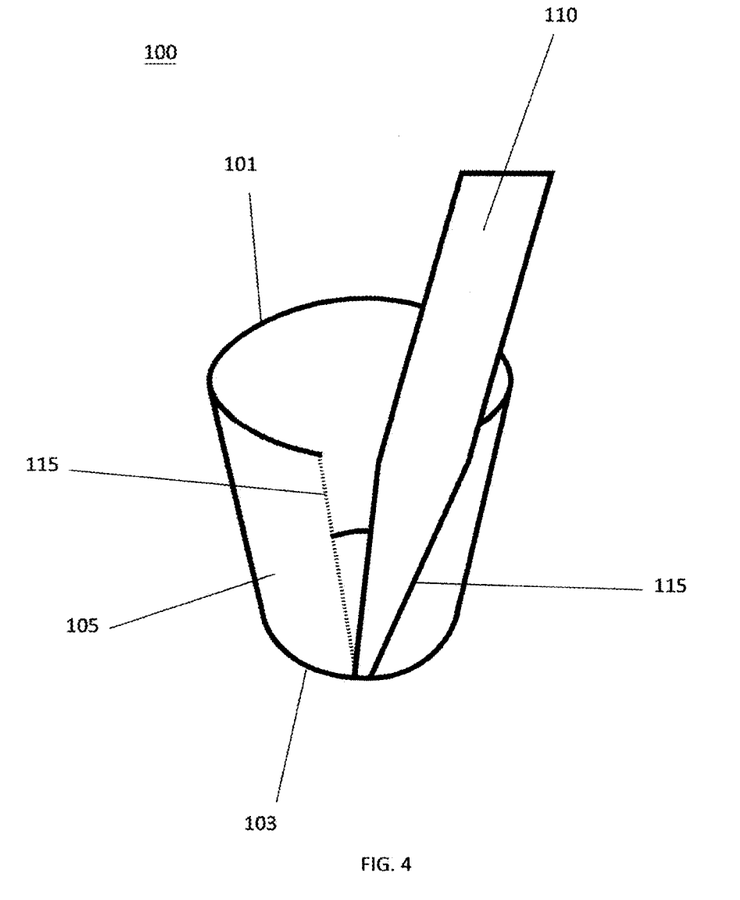
FIG. 4 is a side view of an embodiment of the present invention with the tab having been partially removed.
Figure 5:
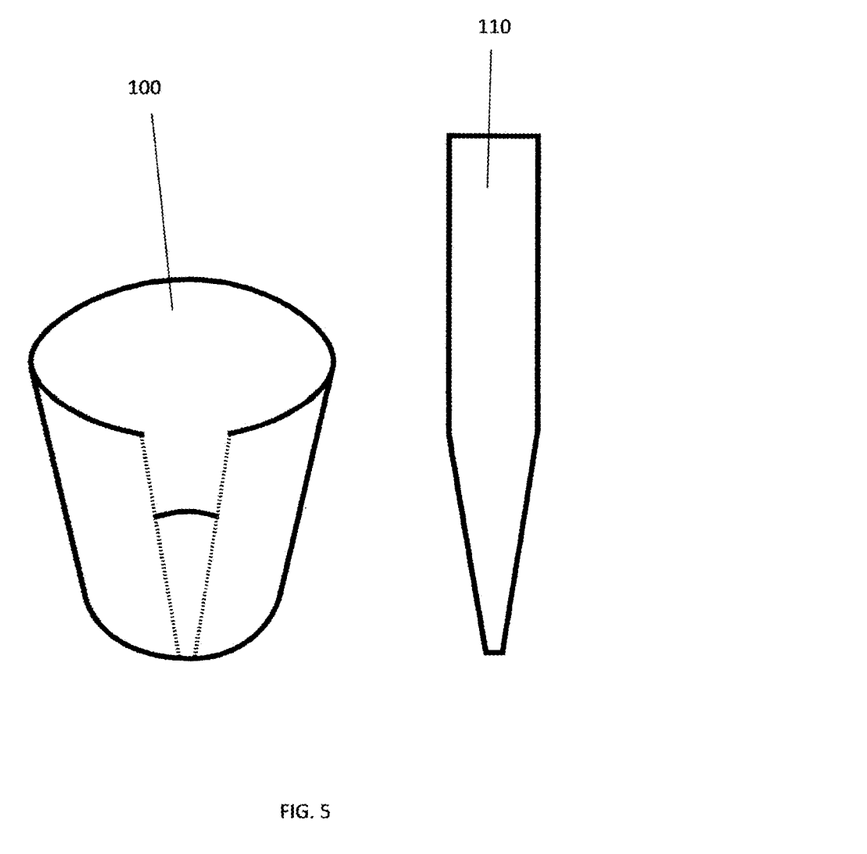
FIG. 5 is a side view of an embodiment of the present invention with the tab having been removed from the retainment vessel.

Referring now to FIGS. 4-5, there is the seed starting apparatus 100 showing a progression of the removal of the tab 110. The perforations 115 flank the tab 110 such that the retainment vessel 105 may be flexed along the perforations 115 to facilitate the separation. In other embodiments, one simply grips an upper portion of the tab 110, and pulls downwards while securing a position of the retainment vessel 105 thereby separating the tab 110 from the retainment vessel 105. In FIG. 5, the seed starting apparatus 100 and the tab 110 are shown fully separated.

Figure 6:
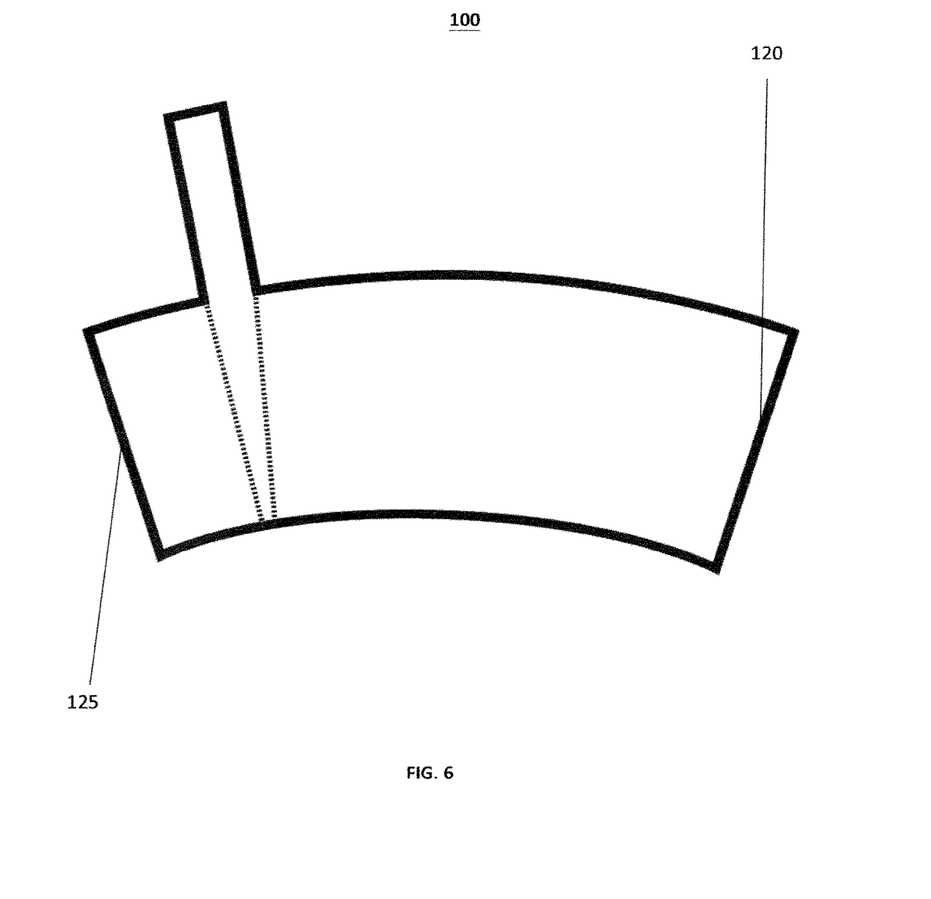
FIG. 6 is a front view of a deconstructed embodiment of the present invention.

In FIG. 6, there is a view of a deconstructed seed starting apparatus 100. In order to make the seed starting apparatus 100, the seed starting apparatus 100 may first initially be flat. The material may be created in the desired shape or may be cut or punched out of a larger piece of the material comprising the invention. In order to construct the seed starting apparatus 100, one must overlap a first edge 120 with a second edge 125 and secure some portion of the surface area of the overlapped regions to one another. This assembly step may be completed by the manufacturer or by the consumer. Once constructed, the seed starting apparatus 100 takes the form as shown in at least FIGS. 1-3.

Referring now to FIGS. 7-11, the drawings show a chronological progression of an exemplary intended use of the seed starting apparatus 100.

Figure 7:
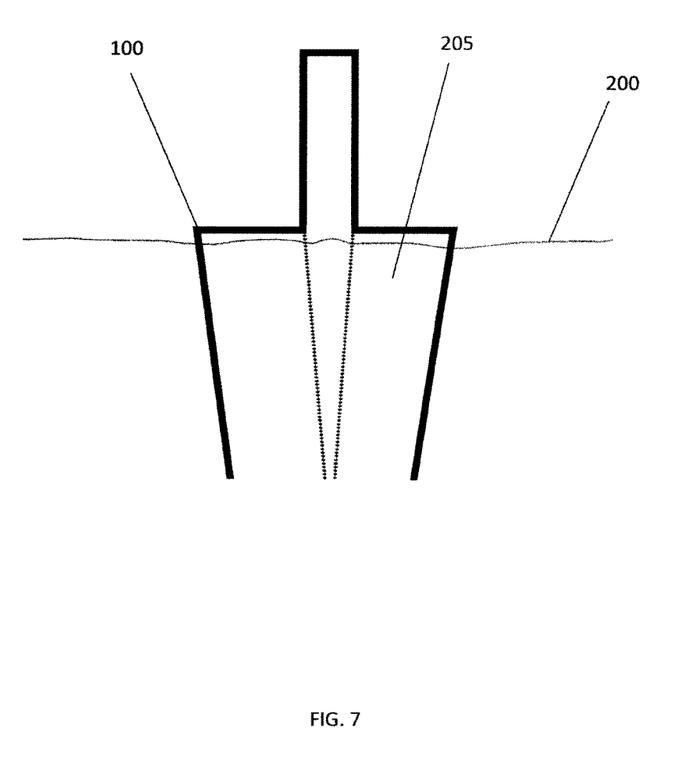
FIG. 7 is a side view of an embodiment of the present invention partially embedded in a seed starting location.

In FIG. 7, the seed starting apparatus 100 has been inserted into a seed starting location 200. The seed starting location 200 may be a number of places including preferably the ground (earth), within planting pots, and the like. A growing medium 205 may be inserted into the seed starting apparatus 100. The growing medium 205 may, in some instances, have the same composition as the seed starting location 200 in the event the seed starting location 200 is in the ground or earth. In other embodiments, "micro-environments" of particular a pH, nutrients, and medium type may be introduced within the confines the of seed starting apparatus 100.

Figure 8:
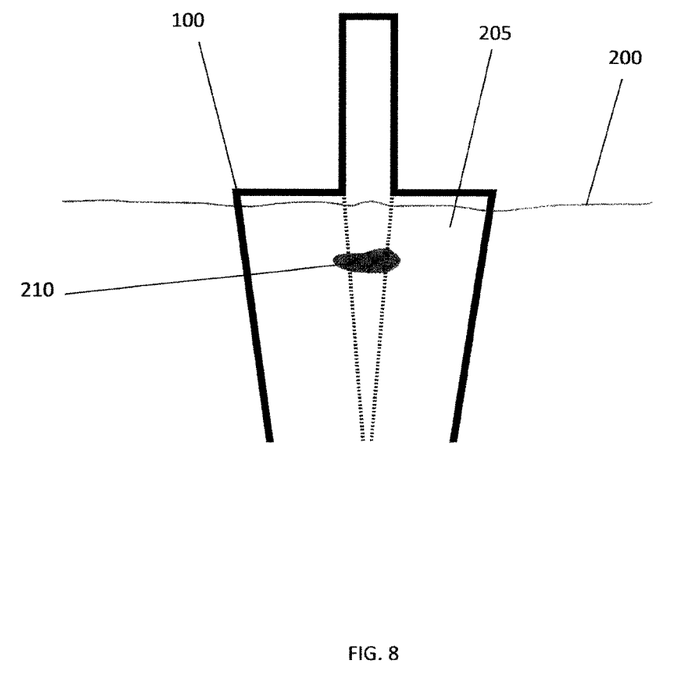
FIG. 8 is a side view of an embodiment of the present invention partially embedded in a seed starting location with a seed therein.

As shown in FIG. 8, a seed 210 or seeds may be introduced into seed starting apparatus 100. The seed 210 may be covered or uncovered by the growing medium 205. If the seed 210 is to be covered, it is desirable that the growing medium 210 only be filled partially within the seed starting apparatus 100 prior to introduction of the seed 210. Preferably, the total height of the growing medium 205 contained within the seed starting apparatus 100 is about 0.5 inches to about 4 inches below that of the top edge of the opening of the seed starting apparatus. This allows the seed starting apparatus 100 to protect the seed(s) 210 from wash-outs stemming from heavy rain, provide some amount of shade, and prevent direct contact with very young seedlings (from people, animals, and the like).

Figure 9:
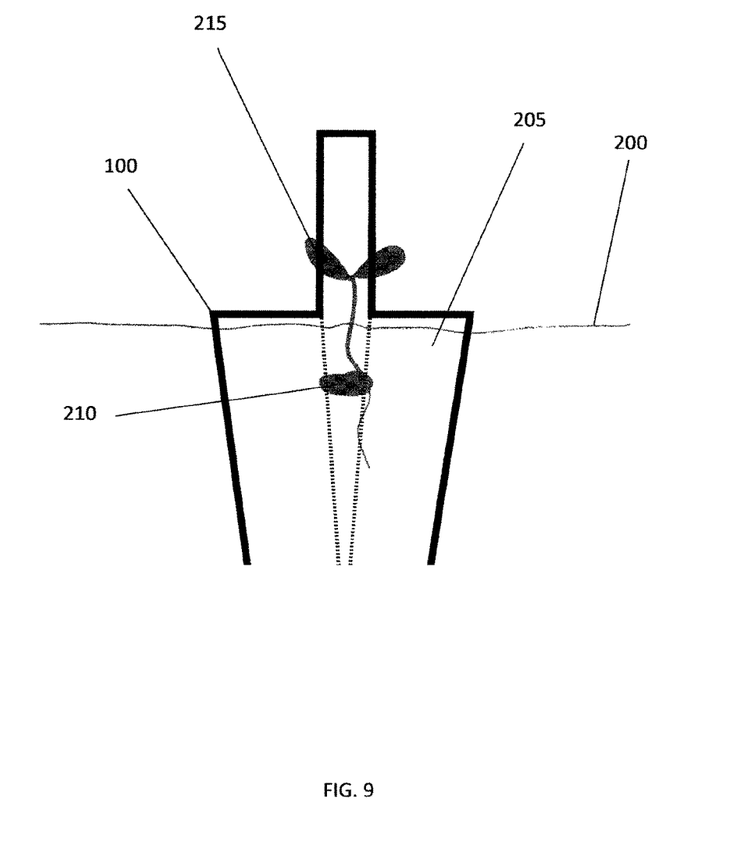
FIG. 9 is a side view of an embodiment of the present invention partially embedded in a seed starting location with a seedling therein.
Figure 10:
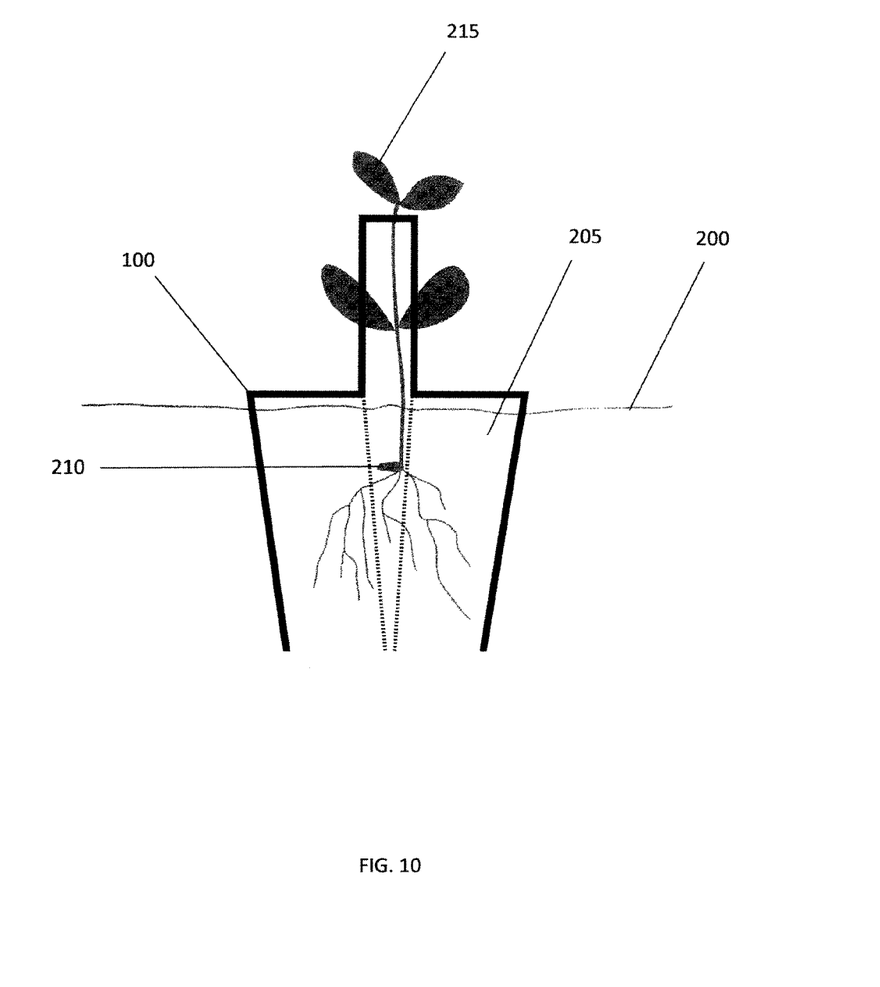
FIG. 10 is another side view of an embodiment of the present invention partially embedded in a seed starting location with a larger seedling therein.

In FIGS. 9-10, the seed 210 has sprouted into a seedling 215 bearing traditional plant features including, for illustrative purposes, a stem, leaves, and root system. As the seedling 215 grows, the growing medium 205 and any additional additives help the plant to establish a root system to support the plant. During this time, the seedling 215 is still fragile and thus the seed starting apparatus 100 remains.

Figure 11:
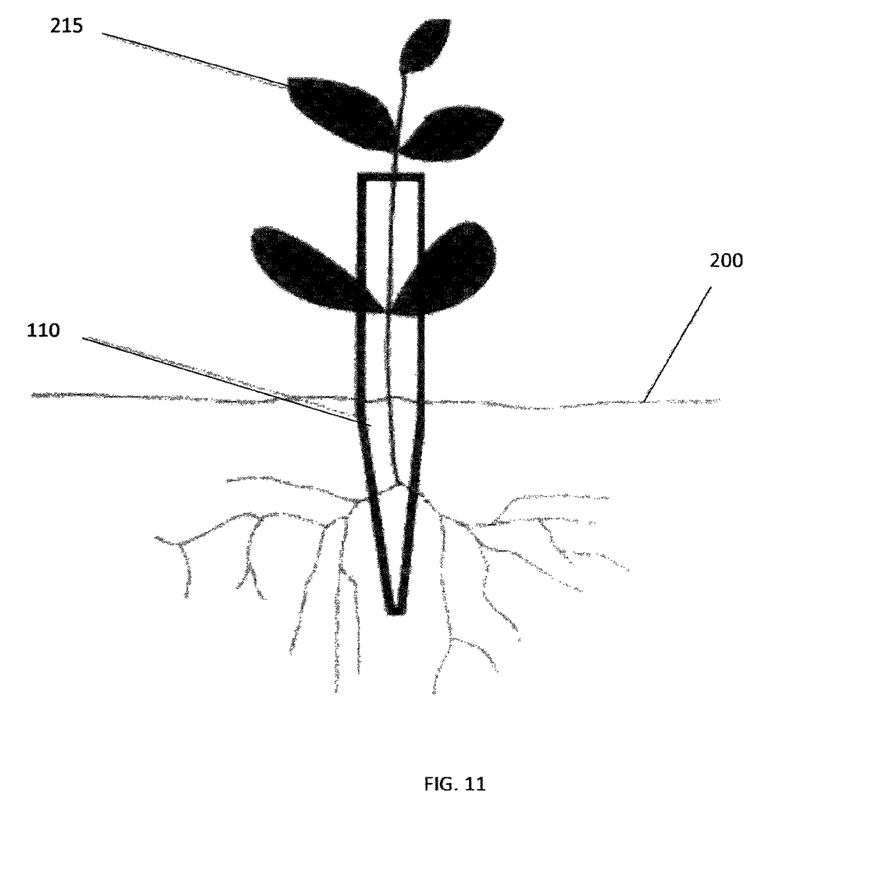
FIG. 11 is a side view of an established seedling with the retainment vessel having been removed leaving only the tab behind.

Referring now to FIG. 11, the seedling 215 has matured to a point where removal of the seed starting apparatus 100 will not have a negative impact on the rapidly growing botanical structures. The seedling 215 is now firmly residing in the seed starting location 200 where it will remain unless otherwise transplanted. The removal of the seed starting apparatus 100 has been facilitated by the perforations (see FIGS. 4-5) present in the seed starting apparatus 100. By grasping of the tab 110 and the containment vessel, one can remove the two structures leaving behind the tab 110. The tab 110 can then be detached and left in the seed starting location 200 in a proximity to the established plant. The tab 110 may have a surface thereon to receive indicia regarding the plant such as a plant type, date planted, etc. or some combination thereof. The tab surface in such embodiments may be reusable (indicia placed thereon can be removed).

Figure 12:
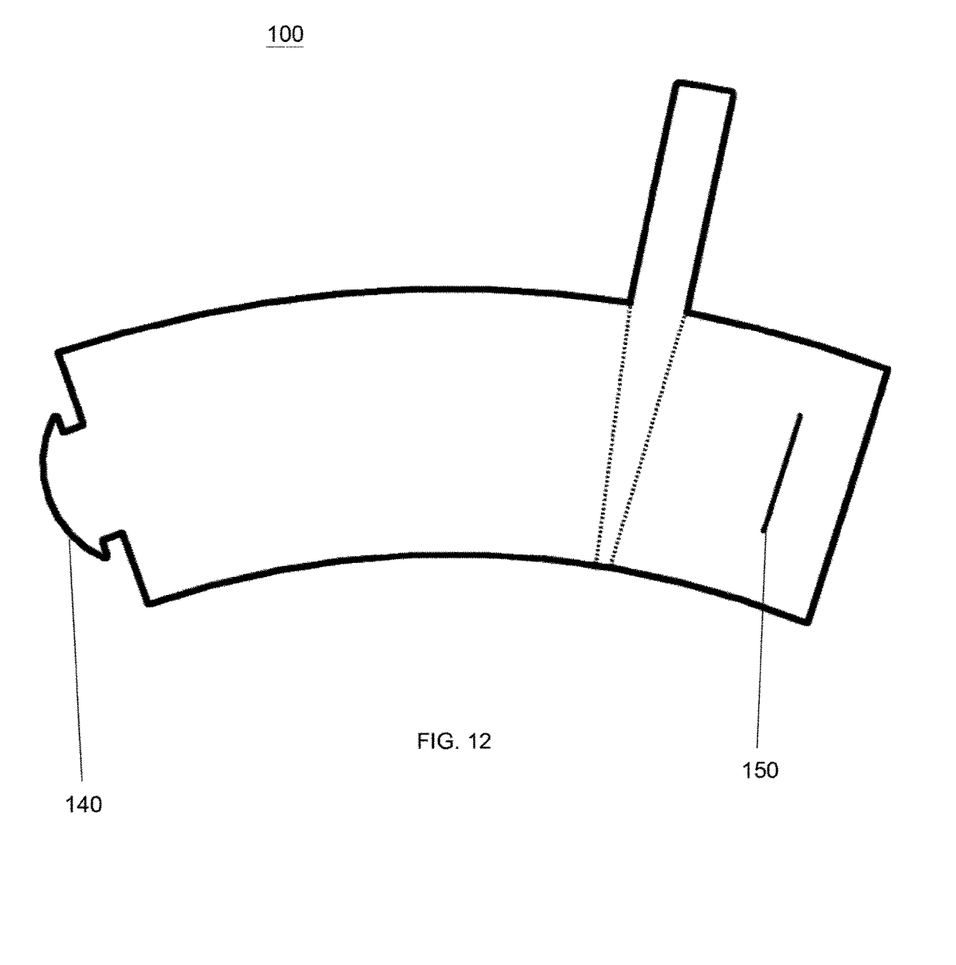
FIG. 12 is a front view of a deconstructed embodiment of a second embodiment of the present invention.

Referring now to FIG. 12, there is a second embodiment of the seed starting apparatus 100. As opposed to the embodiment shown in FIG. 6, adhesives or other mechanisms of adhering the two edges are not required.

Here, the seed starting apparatus 100 has a slit 150 and a tab 140. The tab 140 is configured to pass through and be retained by the slit 150. The tab 140 may have a neck portion and a head portion. The head portion may be shaped, as shown, with two corners that are separated by a distance that is greater than a length of the slit 150. The enables the tab 140 to be properly retained by the slit 150 and prevent the two structures from becoming detached from one another. The slit(s) 150 may vary in number, size, shape, etc. Further, the slit 150 may be positioned at any location upon the seed starting apparatus 100. In yet other embodiments, an adhesive or additional material may be overlaid on or otherwise placed thereon to solidify the connection between the slit 150 and the tab 140.

In a field test using the seed starting apparatus 100, as described in FIGS. 1-12, as opposed to a control (no seed starting apparatus), the following results were found.

For the control, 250 seeds were chosen and planted using the same growing mediums, similar locations, same seed brand/type (variety of Park seed) and same nutrients (fertilizers, water, light, etc.). The seed selection comprised: 1) 25 Sunflower Cherry Rose, 2) 25 Sunflower Soraya, 3) 25 Marigold Inca II Hybrid mix, 4) 50 Marigold Janie flame, 5) 50 Zinnia Parks pick deep red, 6) 25 Zinnia Dreamland Scarlet Hybrid, and 7) 50 Zinnia Parks pick mix.

Of the above seeds, 42 of the seeds germinated and 19 of the germinated seedlings grew into established plants. 23 of the 42 seeds that did not survive after germination perished due to uncontrollable environmental factors such as heavy rains. This equates to a 17% success rate in germination and an 8% rate of survival.

For the experimental seed group, that is those protected by the seed starting apparatus of the present invention, the following seed selection was utilized: 400 seeds total selected from 1) 25 Sunflower Cherry Rose, 2) 25 Sunflower Soraya, 3) 25 Marigold Inca II Hybrid mix, 4) 100 Marigold Janie flame, 5) 100 Zinnia Parks pick deep red, 6) 25 Zinnia Dreamland Scarlet Hybrid, and 7) 100 Zinnia Parks pick mix.

Of the above seeds, 389 of the seeds germinated and 389 of the germinated seedlings grew into established plants. This equates to a 97% success rate in germination and a 100% rate of survival after germination. The results of the above demonstrate the superiority in utilizing the present invention when planting from a seed.

Although this invention has been described with a certain degree of particularity, it is to be understood that the present disclosure has been made only by way of illustration and that numerous changes in the details of construction and arrangement of parts may be resorted to without departing from the spirit and the scope of the invention.

What is claimed is:

1. A method of planting at least one seed consisting of:
providing a seed starting apparatus comprising:
a circular retainment vessel having an open top end and an open bottom end;
a slit disposed in proximity to a first end of the circular retainment vessel;
a tab disposed on a second end of the circular retainment vessel, the tab being configured to engage and be retained by the slit,
wherein the tab has a neck and a head, with the head having a width that is greater in length than a length of the slit; and
at least one removable tab extending above the open top end of the circular retainment vessel,
wherein the at least one removable tab has perforations located along a first lateral edge and a second lateral edge of the at least one removable tab, and
wherein the at least one removable tab is wider at the open top end than at the open bottom end;
deforming the tab;
inserting the tab, while deformed, through the slit;
releasing the tab to secure a position of the tab relative to the slit;
positioning the seed starting apparatus in a seed growing location;
filling the seed starting apparatus with a growing medium, wherein a composition of the growing medium is distinct from a composition of a medium present in the seed growing location, and
wherein a top surface of the growing medium is below that of the open top end of the circular retainment vessel;
positioning the at least one seed into the growing medium;
removing, by a user, the at least one removable tab from the seed starting apparatus by grasping a portion of the at least one removable tab extending above the open top end of the circular retainment vessel and pulling the at least one removable tab downwards towards the bottom open end of the circular retainment vessel,
wherein the at least one removable tab is removed after the seed starting apparatus has been positioned in the seed growing location, and
vertically positioning the at least one removable tab in proximity to at least one plant emanating from the at least one seed for a duration of a life cycle of the at least one plant,
wherein the at least one removable tab is positioned with a tapered end of the at least one removable tab inserted in the seed growing location in proximity to the at least one plant and with a portion of the at least one removable tab being positioned above a top surface of the seed growing location.

2. The method of claim 1 wherein the circular retainment vessel comprises at least one polymer and at least one biodegradable material.

3. The method of claim 1 wherein the circular retainment vessel comprises at least one fiber reinforced material.

4. The method of claim 1 wherein the circular retainment vessel comprises at least one fiber reinforced material and a corrugated paper.

5. The method of claim 1 wherein a pH of the growing medium is higher than that of the medium in the seed growing location.

6. The method of claim 1 wherein a pH of the growing medium is lower than that of the medium in the seed growing location.

7. The method of claim 1 wherein the growing medium contains added nutrients.

8. The method of claim 1 wherein more than one of the seed starting apparatus is positioned in the seed growing location and each of the more than one seed starting apparatus contains a microenvironment formed by the growing medium in relation to the medium of the seed growing location.

\* \* \* \* \*